(12) United States Patent
Hong

(10) Patent No.: US 11,982,440 B1
(45) Date of Patent: May 14, 2024

(54) LENS TO PRODUCE WIDE ANGLE LIGHT OUTPUT IN HIGH DENSITY LED ARRAYS

(71) Applicant: Dialight Corporation, Farmingdale, NJ (US)

(72) Inventor: Qi Hong, Morganville, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 18/332,154

(22) Filed: Jun. 9, 2023

(51) Int. Cl.
| | |
|---|---|
| *F21V 5/04* | (2006.01) |
| *F21V 5/00* | (2018.01) |
| *F21Y 115/10* | (2016.01) |
| *G02B 13/06* | (2006.01) |

(52) U.S. Cl.
CPC .............. *F21V 5/048* (2013.01); *F21V 5/007* (2013.01); *F21Y 2115/10* (2016.08); *G02B 13/06* (2013.01)

(58) Field of Classification Search
CPC .......... G02B 13/06; F21V 5/048; F21V 5/007
See application file for complete search history.

(56) References Cited

U.S. PATENT DOCUMENTS

| | | | | |
|---|---|---|---|---|
| 7,348,723 B2 * | 3/2008 | Yamaguchi | ........ | G02B 19/0071 362/311.06 |
| 7,854,536 B2 * | 12/2010 | Holder | .................. | F21V 7/0066 362/800 |
| 8,339,716 B2 * | 12/2012 | Premysler | ................. | F21V 5/04 359/728 |
| 8,430,538 B2 * | 4/2013 | Holder | ....................... | F21K 9/60 362/311.06 |
| 8,545,049 B2 * | 10/2013 | Davis | ....................... | B29C 65/48 362/249.02 |
| 8,992,053 B2 * | 3/2015 | Pelka | ......................... | F21V 5/04 362/311.1 |
| 9,057,498 B2 * | 6/2015 | Nall | ........................ | G09F 13/22 |
| 9,945,527 B2 * | 4/2018 | Jha | ........................ | F21S 41/141 |
| 9,951,922 B2 * | 4/2018 | Jha | ........................ | F21S 43/14 |
| 2008/0100773 A1 * | 5/2008 | Hwang | ............. | G02F 1/133606 362/361 |

* cited by examiner

*Primary Examiner* — Arman B Fallahkhair
(74) *Attorney, Agent, or Firm* — Tong, Rea, Bentley & Kim, LLC

(57) ABSTRACT

The present disclosure is directed to examples of a lens. In one embodiment, the lens includes an input surface and an output surface. The input surface includes a first input surface segment, a second input surface segment, and a third input surface segment. The second input surface segment is positioned to redirect light emitted at a range of angles by a light emitting diode (LED) to prevent being blocked by an adjacent LED assembly. The output surface includes a first output surface segment and a second output surface segment. The second output surface segment and the second input surface segment form a convex lens and the second output surface segment is positioned to receive and redirect the light emitted at the range of angles by the LED that are redirected by the second input surface segment to a second range of angles that avoids the adjacent LED assembly.

18 Claims, 3 Drawing Sheets

LENS TO PRODUCE WIDE ANGLE LIGHT OUTPUT IN HIGH DENSITY LED ARRAYS

BACKGROUND

Luminaires can be used to illuminate an area. Luminaires can include various types of light sources such as incandescent bulbs or light emitting diodes (LEDs). Currently, LEDs are preferred due to lower energy usage and the ability to provide sufficient light output.

LEDs may emit light in a hemispherical pattern. Lenses and/or optics can be used to shape the pattern of light emitted from the LEDs. Typically, the optics shape the light emitted from the LEDs along the optical axes of the LEDs. In some instances, an array of LEDs may be deployed to generate a desired light output for a luminaire.

SUMMARY

In one embodiment, the present disclosure provides a lens. In one embodiment, the lens comprises an input surface, comprising a first input surface segment, a second input surface segment, and a third input surface segment, wherein the first input surface segment, the second input surface segment, and the third input surface segment have a cylindrical shape, wherein the second input surface segment is positioned to redirect light emitted at a range of angles by a light emitting diode (LED) to prevent being blocked by an adjacent LED assembly and an output surface, comprising a first output surface segment and a second output surface segment, wherein the second output surface segment and the second input surface segment form a convex lens and the second output surface segment is positioned to receive and redirect the light emitted at the range of angles by the LED that are redirected by the second input surface segment to a second range of angles that avoids the adjacent LED assembly.

In one embodiment, the present disclosure provides an LED assembly. In one embodiment, the LED assembly comprises an LED and a lens. The lens comprises an input surface to enclose the LED and an output surface. The input surface comprises a first input surface segment, a second input surface segment, and a third input surface segment, wherein the first input surface segment, the second input surface segment, and the third input surface segment have a cylindrical shape, wherein the second input surface segment is positioned to redirect light emitted at a range of angles by the LED to prevent being blocked by an adjacent LED assembly. The output surface comprises a first output surface segment and a second output surface segment, wherein the second output surface segment and the second input surface segment form a convex lens and the second output surface segment is positioned to receive and redirect the light emitted at the range of angles by the LED that are redirected by the second input surface segment to a second range of angles that avoids the adjacent LED assembly.

In one embodiment, the present disclosure provides a luminaire. In one embodiment, the luminaire comprises a plurality of LED assemblies arranged in a two-dimensional array, wherein the plurality of LED assemblies each comprises an LED and a lens. The lens comprises an input surface to enclose the LED and an output surface. The input surface comprises a first input surface segment, a second input surface segment, and a third input surface segment, wherein the first input surface segment, the second input surface segment, and the third input surface segment have a cylindrical shape, wherein the second input surface segment is positioned to redirect light emitted at a range of angles by the LED to prevent being blocked by an adjacent LED assembly. The output surface comprises a first output surface segment and a second output surface segment, wherein the second output surface segment and the second input surface segment form a convex lens and the second output surface segment is positioned to receive and redirect the light emitted at the range of angles by the LED that are redirected by the second input surface segment to a second range of angles that avoids the adjacent LED assembly.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure provides a lens that can produce a wide angle light output in a high density LED array. As discussed above, luminaires can be used to illuminate an area. Luminaires can include various types of light sources such as incandescent bulbs or light emitting diodes (LEDs). Currently, LEDs are preferred due to lower energy usage and the ability to provide sufficient light output.

LEDs may emit light in a hemispherical pattern. Lenses and/or optics can be used to shape the pattern of light emitted from the LEDs. Typically, the optics shape the light emitted from the LEDs along the optical axes of the LEDs.

However, for some applications, it may be desirable to deploy an array of LEDs to generate a desired light output for a luminaire. When the LEDs are spaced too far apart in the array, the LEDs may be visible as dots or hot spots in the luminaire. The appearance of the LEDs in the luminaire may be undesirable. As a result, the LEDs may be placed closer together in a high density arrangement such that the location of each LED in the luminaire is not visible.

However, when the LEDs are arranged in a high density pattern, the light output from each LED may suffer. In other words, the LEDs may not operate as efficiently due to interference from adjacent LEDs, and more specifically a lens of the adjacent LED. For example, the high angle light output from the LEDs may be blocked by the adjacent LEDs. Thus, some of the light output may be lost. This may lead to a reduction in the overall light output for the luminaire compared to an expected light output for a number of LEDs in the luminaire.

The present disclosure provides a lens that can redirect high angle light output to a lower angle. As a result, the high angle light output may avoid being blocked by adjacent LEDs. The redirected light may improve the efficiency of the light output of each LED in the array and produce a desired light output for the luminaire. In other words, the lens of the present disclosure may allow each LED in a high density LED array to produce a wide angle light output without interference from adjacent LEDs.

Figure 1:
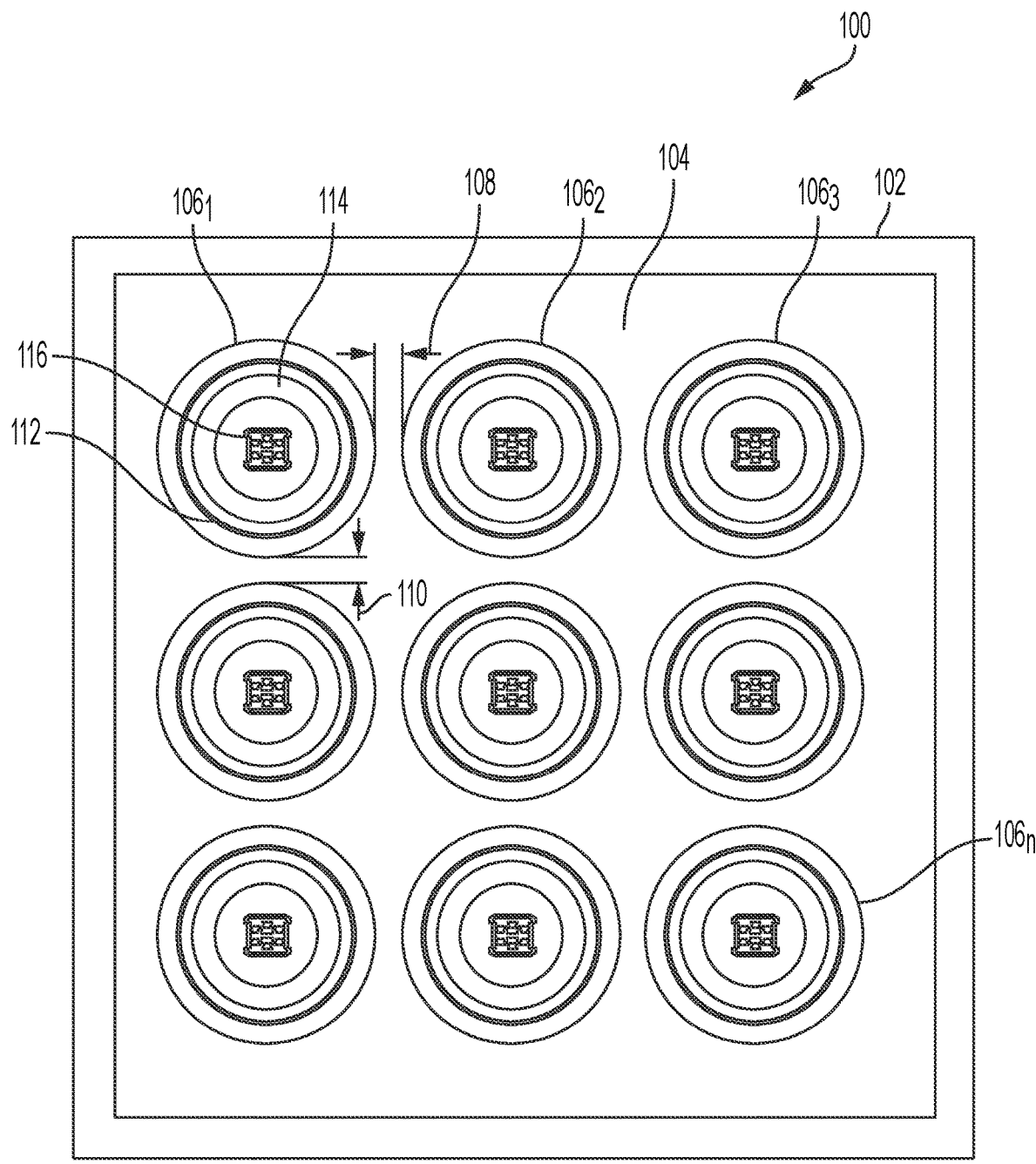
FIG. 1 depicts a top view of an example luminaire with a plurality of LED assemblies of the present disclosure.

FIG. 1 illustrates an example luminaire 100 with a plurality of LED assemblies 1061 to 106n (hereinafter also referred to individually as an LED assembly 106 or collectively as LED assemblies 106). Although nine LED assemblies 106 are illustrated in FIG. 1, it should be noted that any number of LED assemblies 106 may be deployed in the luminaire 100 for any particular application and/or desired light output.

In one embodiment, the luminaire 100 may include a housing 102 to enclose the LED assemblies 106. The luminaire 100 may also include a lens 104 to redistribute light emitted from the LED assemblies 106. It should be noted that the luminaire 100 may be simplified for ease of explanation and additional components may be included that are not shown. For example, the luminaire 100 may include a power supply, one or more heat sinks, a printed circuit board, sensors, controls, and the like.

In one embodiment, the LED assemblies 106 may be arranged in a two-dimensional array. Each LED assembly 106 within a row may be separated by a distance 108. Each LED assembly 106 within a column may be separated by a distance 110. In one embodiment, the distances 108 and 110 may be set to a minimum distance at which the location of each LED assembly 106 within the luminaire 100 is undetectable. For example, depending on the size and light output of the LED assemblies 106, the distances 108 and 110 may range from 0.5 millimeters (mm) to 10 mm.

However, when the LED assemblies 106 are placed so close together, the light output efficiency of each LED assembly 106 may be reduced with previous LED assembly designs. As noted above, when the LED assemblies 106 are placed close together, some of the light emitted from the LED assemblies 106 may be blocked by an adjacent LED assembly 106, and more specifically a lens of the adjacent LED assembly 106, and lost in previous designs.

However, the design of the LED assemblies 106 of the present disclosure can include lenses that are designed to redirect light emitted at certain angular ranges that would otherwise be blocked by an adjacent LED assembly 106. The light can be redirected to lower angles such that the light may avoid being blocked by the adjacent LED assembly or assemblies 106.

Figure 2:
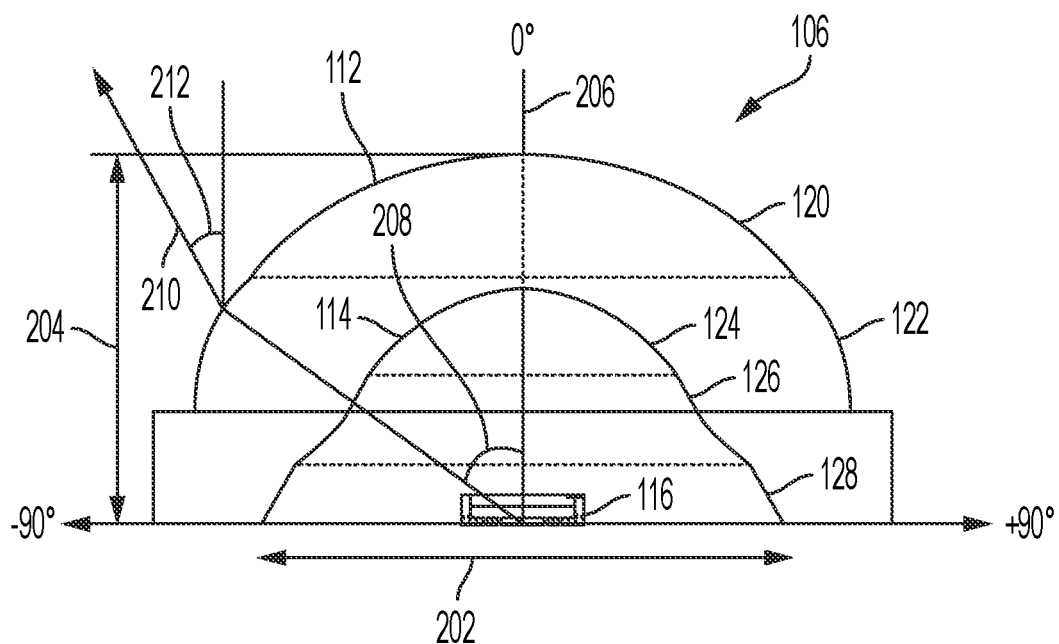
FIG. 2 depicts a cross-sectional view of an example of the LED assembly of the present disclosure.

FIG. 2 illustrates a cross-sectional view of an example LED assembly 106 of the present disclosure. In one embodiment, the LED assembly 106 may include an LED 116, an input surface 114, and an output surface 112. The input surface 114 and the output surface 112 may operate as a lens of the LED assembly 106. In other words, the input surface 114 and the output surface 112 may form a solid lens. As discussed in further details below, the lens comprising the input surface 114 and the output surface 112 may be designed such that certain segments of the input surface 114 and the output surface 112 may work together to redirect high angle light rays to lower angle light rays and avoid adjacent LED assemblies 106. The LED assembly 106 may have a diameter 202 and a height 204.

The input surface 114 may be an optically clear lens that has a generally semi-hemispherical or dome shape. The input surface 114 may enclose the LED 116. The input surface 114 may be fabricated from optically clear materials such as polycarbonate, glass, or any other optical grade polymers.

In one embodiment, the input surface 114 may include a first input surface segment 124, a second input surface segment 126, and a third input surface segment 128. Although, the first input surface segment 124, the second input surface segment 126, and the third input surface segment 128 are discussed as separate segments, it should be noted that the first input surface segment 124, the second input surface segment 126, and the third input surface segment 128 may be formed as a single unitary piece of material or lens. For example, the different input surface segments 124, 126, and 128 may be formed from a mold.

In one embodiment, the first input surface segment 124 and the third input surface segment 128 may have a cross-section that has a curve that curves away from the LED 116. The amount of curvature in the first input surface segment 124 and the third input surface segment 128 may be the same or different. The second input surface segment 126 may have a cross-sectional curvature that is different from the first input surface segment 124 and the third input surface segment 128.

In one embodiment, the second input surface segment 126 may have a cross-section with a curve that curves towards the LED 116. Thus, the direction of the curvature of the second input surface segment 126 may be different than the direction of curvature of the first input surface segment 124 and the third input surface segment 128.

In one embodiment, the first input surface segment 124 may have a first diameter or a first average diameter. The second input surface segment 126 may have a second diameter or a second average diameter. The third input surface segment 128 may have a third diameter or third average diameter. The third diameter may be the largest and may be greater than the second diameter. The second diameter may be larger than the first diameter. Thus, the second input surface segment 126 may be formed on the third input surface segment 128 and the first input surface segment 124 may be formed on the second input surface segment 126.

The output surface 112 may be an optically clear lens that has a generally semi-hemispherical or dome shape. The output surface 112 may enclose the input surface 114 and the LED 116. The output surface 112 may be fabricated from optically clear materials such as polycarbonate, glass, or any other optical grade polymers.

In one embodiment, the output surface 112 may include a first output surface segment 120 and a second output surface segment 122. Although, the first output surface segment 120 and the second output surface segment 122 are discussed as separate segments, it should be noted that the first output surface segment 120 and the second output surface segment 122 may be formed as a single unitary piece of material or lens. For example, the different output surface segments 120 and 122 may be formed from a mold.

In one embodiment, the first output surface segment 120 and the second output surface segment 122 may have a cross-section that has a curve that curves away from the LED 116. The amount of curvature in the first output surface segment 120 may be different than the amount of curvature in the second output surface segment 122. In one embodiment, the amount of curvature in the second output surface segment 122 may be greater than the amount of curvature in the first output surface segment 120.

In one embodiment, the first output surface segment 120 may have a first diameter or a first average diameter. The second output surface segment 122 may have a second diameter or a second average diameter. The second diameter of the second output surface segment 122 may be larger than the first diameter of the first output surface segment 120. Thus, the first output surface segment 120 may be formed on the second output surface segment 122.

In one embodiment, the second input surface segment 126 and the second output surface segment 122 may be arranged to form a convex curved lens. The second input surface segment 126 and the second output surface segment 122 may work together to redirect light to lower angles to avoid adjacent LED assemblies, as discussed below.

In one embodiment, the LED 116 may emit light in a hemispherical pattern. The combination of the input surface 114 and the output surface 112 may redistribute the light from the LED assembly 106 into a "bat wing" pattern. For example, a central light emitting axis 206 may be considered 0 degrees. Light may be emitted from the LED assembly 106 with a sharp cut-off at high angles and peaks that are away from the central light emitting axis 206.

As noted above, in traditional LED assembly designs, there is a sharp cut-off in light intensity at around −60 to +60 degrees due to light being blocked by adjacent LEDs. However, the design of the LED assembly 106 allows for more efficient light output and extending the cut-off further out to −70/+70 degrees or even −80/+80 degrees.

In one embodiment, the second input surface segment 126 and the second output surface segment 122 may work together to redirect some of the light emitted from the LED 116 and maximize the light efficiency of the LED assembly 106. For example, the design of the second input surface segment 126 and the second output surface segment 122 may provide sufficient redirection of light and a light efficiency of greater than 70% of the maximum expected efficiency without any blockage of light by adjacent LED assemblies 106.

In one embodiment, the second input surface segment 126 may redirect a light ray 210 emitted at a particular angle or range of angles 208 emitted from the LED 116. The second output surface segment 122 may be positioned to capture any light rays 210 that exit from the second input surface segment 126. In other words, any light rays 210 that pass through the second input surface segment 126 may also pass through the second output surface segment 122.

Figure 5:
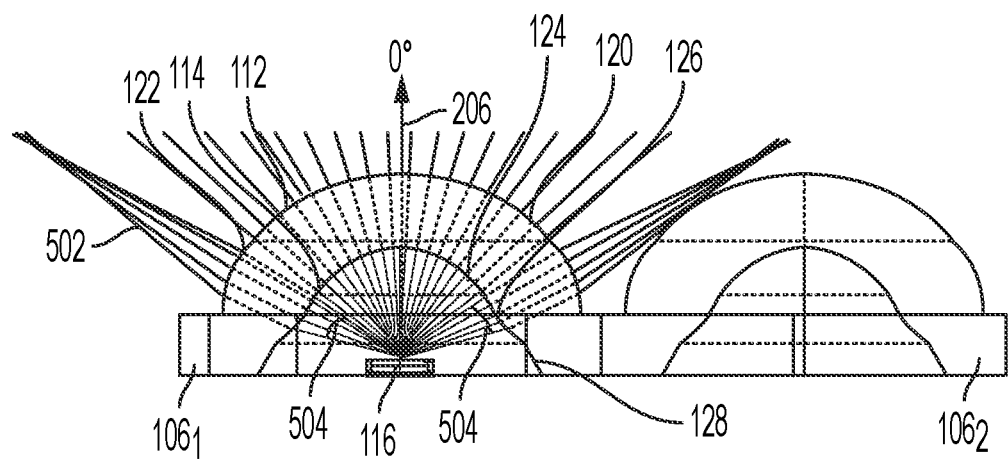
FIG. 5 depicts a side view of adjacent LED assemblies and example light rays redirected by example lenses of the example LED assemblies of the present disclosure.

The light ray 210 may then exit the second output surface segment 122 at an angle 212 that is lower than the angle 208 that the light ray 210 was originally emitted by the LED 116. The angle 212 may be low enough to clear the height 204 of an adjacent LED assembly 106, as shown in FIG. 5 and discussed in further details below.

The dimensions of the inner surface 114 and the outer surface 112, the amount of curvature of the second input surface segment 126 and the second output surface segment 122 may be a function of the diameter 202 and the height 204 of the LED assemblies 106 and the distances 108 and 110 between the LED assemblies 106 in the luminaire 100.

However, the second input surface segment 126 and the second output surface segment 122 may be positioned regardless of size, dimensions, and distance to redirect light emitted from the LED 116 at a range of angles of approximately 20 degrees to 90 degrees relative to the central optical axis 206. In one embodiment, the range of angles may be approximately 40 degrees to 50 degrees relative to the central optical axis 206.

Figure 3:
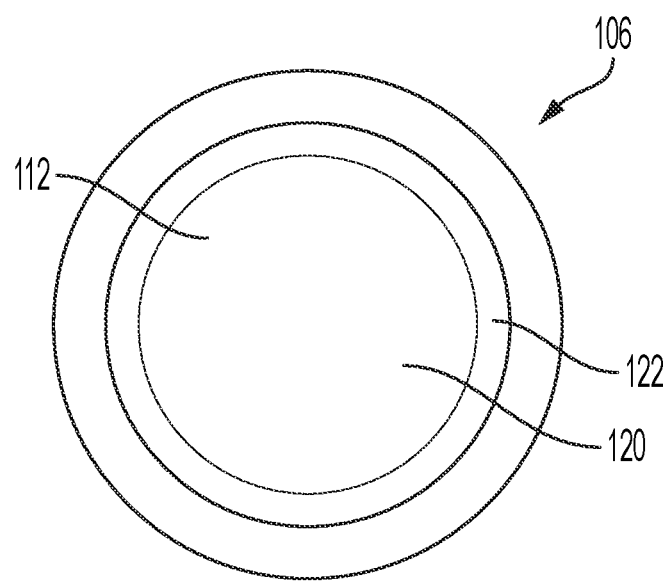
FIG. 3 depicts a top view of the example LED assembly of the present disclosure.
Figure 4:
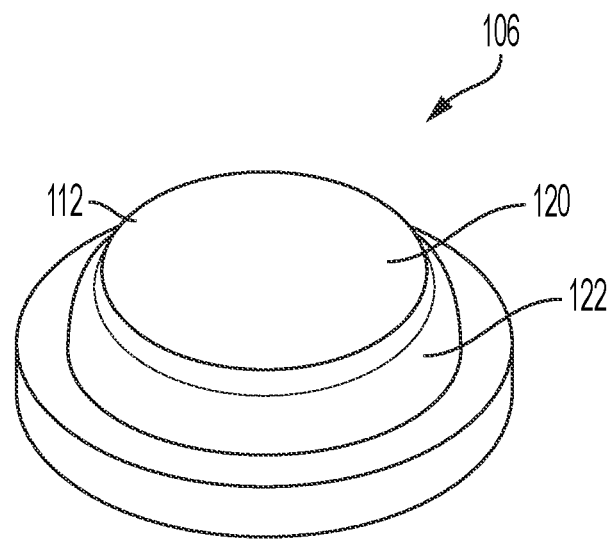
FIG. 4 depicts a side view of the example LED assembly of the present disclosure.

FIG. 3 illustrates a top view of the LED assembly 106. FIG. 4 illustrates an isometric view of the LED assembly 106. FIGS. 3 and 4 illustrate how the second output surface segment 122 has a different amount of curvature than the first output surface segment 120. FIGS. 3 and 4 illustrate the additional "bulge" from the additional curvature of the second output surface segment 122 compared to the first output surface segment 120.

FIGS. 3 and 4 also illustrate the relative dome or hemispherical shape of the output surface 112. Thus, the output surface 112 may have an internal volume that encloses the input surface 114 and the LED 116. The input surface 114 may also have a relative dome or hemispherical shape with an internal volume to enclose the LED 116, as described above.

FIG. 5 illustrates a side view of adjacent LED assemblies 106₁ and 106₂ and an example of how light rays 502 are redirected by the input surface 114 and the output surface 112 of the LED assembly 106₁ of the present disclosure. In one embodiment, the LED assemblies 106₁ and 106₂ may be part of a two-dimensional array of LED assemblies 106₁-106n of the luminaire 100.

FIG. 5 illustrates example light rays 502 emitted by the LED 116. It should be noted that the LED assembly 106₂ may also emit light rays 502 similarly, but are not illustrated for ease of explanation. Thus, any description regarding the light rays 502 and how they are redirected by the input surface 114 and the output surface 112 may equally apply to other LED assemblies 106.

FIG. 5 illustrates how the light rays 502 are emitted in hemispherical pattern in all directions around the LED 116. A particular range of angles 504 of the light rays 502 emitted by the LED 116 in the LED assembly 106₁ may be blocked by the adjacent LED assembly 106₂ if not redirected. However, as discussed above, the second input surface segment 126 may work with the second output surface segment 122 to redirect the light rays 502 from a high angle to a low angle.

For example, the second input surface segment 126 may redirect light rays 502 that are emitted at a range of angles 504 from 20 degrees to 90 degrees. In one embodiment, the second input surface segment 126 may redirect light rays 502 that are emitted at a range of angles 504 from 40 degrees to 50 degrees.

The second output surface segment 122 may be positioned to receive the light rays 502 that are redirected by the second input surface segment 126. The light rays 502 at the range of angles 504 may then be redirected again by the second output surface segment 122 to an angle lower than the original range of angles 504 that the light rays 502 were emitted from the LED 116. In one embodiment, the second input surface segment 126 and the second output surface segment 122 may work together to redirect the light rays 502 from 20 to 90 degrees or from 40 degrees to 50 degrees.

In one embodiment, the second output surface segment 122 may redirect light at the lower range of angles to a higher range of angles within the range 504 and redirect light at the higher range of angles to a lower range of angles within the range 504. For example, light rays 502 at the lower range (e.g., from 40 to 45 degrees) may be redirected by the second output surface segment 122 to the higher range (e.g., 45 to 50 degrees). As can be seen in FIG. 5, since the lower range of angles is already above the adjacent LED assembly 106₂, the redirected light rays 502 to the higher range (but still within the redirected range of angles 504 of between 40-50 degrees) may still avoid the adjacent LED assembly 106₂. The high range of angles (e.g., 45-50 degrees) that would be blocked by the adjacent LED assembly 106₂ may be redirected to a lower range (e.g., 40-45 degrees) to avoid the adjacent LED assembly 106₂. Thus, the design of the input surface 114 and the output surface 112 may redirect the light rays 502, but still maintain the overall "bat wing" shape of the light output of the luminaire 100.

In addition, since less light is blocked by the adjacent LED assembly 1062 the LED assembly 106 of the present disclosure may still emit light efficiently. For example, redirection of the light rays 502 by the input surface 114 and the output surface 112 may still emit light with an efficiency of greater than 70% of the maximum expected efficiency without any blockage of light by adjacent LED assemblies 106.

Thus, the present disclosure provides an LED assembly with input and output surfaces that are designed to redirect certain portion of light rays emitted by an LED to avoid being blocked by adjacent LED assemblies in an array. As a result, the LED assemblies may be distributed at a higher density array within a luminaire without losing light efficiency. Distributing LED assemblies in an array with minimal distance between LED assemblies may prevent the appearance of "hot spots" in the luminaire (e.g., the ability to see the location of each LED assembly in the luminaire).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A lens for a light emitting diode (LED) assembly comprising:
   an input surface, comprising:
      a first input surface segment;
      a second input surface segment; and
      a third input surface segment, wherein the second input surface segment is positioned to redirect light emitted at angles of 20 degrees to 90 degrees by an LED of the LED assembly, wherein the first input surface segment and the third input surface segment have a cross-sectional curve that curves away from the LED and the second input surface segment has a cross-sectional curve that curves towards the LED; and
   an output surface, comprising:
      a first output surface segment; and
      a second output surface segment, wherein the second output surface segment and the second input surface segment form a convex lens and the second output surface segment is positioned to receive and redirect a portion of the light that are redirected by the second input surface segment to a second range of angles comprising 45 degrees to 50 degrees.

2. The lens of claim 1, wherein the first input surface segment, the second input surface segment, and the third input surface segment, comprise a single unitary piece of material.

3. The lens of claim 2, wherein the single unitary piece of material comprises a plastic, glass, or an optically clear polymer.

4. The lens of claim 1, wherein the first output surface segment has a cross-sectional curvature that is different from a cross-sectional curvature of the second output surface segment.

5. The lens of claim 4, wherein the cross-sectional curvature of the second output surface segment is greater than the cross-sectional curvature of the first output surface segment.

6. The lens of claim 1, wherein the input surface comprises a dome shape to enclose the LED.

7. The lens of claim 1, wherein the first input surface segment has a first diameter, the second input surface segment has a second diameter that is greater than the first diameter, and the third input surface segment has a third diameter that is greater than the second diameter.

8. The lens of claim 1, wherein the first output surface segment and the second output surface segment comprise a single unitary piece of material.

9. The lens of claim 1, wherein the output surface comprises a dome shape to enclose the input surface.

10. A light emitting diode (LED) assembly, comprising:
   an LED; and
   a lens, comprising:
      an input surface to enclose the LED, comprising:
         a first input surface segment;
         a second input surface segment; and
         a third input surface segment, wherein the second input surface segment is positioned to redirect light emitted at a angles of 20 degrees to 90 degrees by the LED of the LED assembly, wherein the first input surface segment and the third input surface segment have a cross-sectional curve that curves away from the LED and the second input surface segment has a cross-sectional curve that curves towards the LED; and
      an output surface, comprising:
         a first output surface segment; and
         a second output surface segment, wherein the second output surface segment and the second input surface segment form a convex lens and the second output surface segment is positioned to receive and redirect a portion of the light that are redirected by the second input surface segment to a second range of angles comprising 45 degrees to 50 degrees.

11. The LED assembly of claim 10, wherein the first input surface segment, the second input surface segment, and the third input surface segment, comprise a single unitary piece of material.

12. The LED assembly of claim 11, wherein the single unitary piece of material comprises a plastic, glass, or an optically clear polymer.

13. The LED assembly of claim 10, wherein the first output surface segment has a cross-sectional curvature that is different from a cross-sectional curvature of the second output surface segment.

14. The LED assembly of claim 13, wherein the cross-sectional curvature of the second output surface segment is greater than the cross-sectional curvature of the first output surface segment.

15. The LED assembly of claim 10, wherein the first input surface segment has a first diameter, the second input surface segment has a second diameter that is greater than the first diameter, and the third input surface segment has a third diameter that is greater than the second diameter.

16. A luminaire comprising: a plurality of light emitting diode (LED) assemblies arranged in a two-dimensional array, wherein the plurality of LED assemblies each comprises: an LED; and a lens, comprising: an input surface to enclose the LED, comprising: a first input surface segment; a second input surface segment; and a third input surface segment, wherein the second input surface segment is positioned to redirect light emitted at a range of angles between 20 degrees to 90 degrees by the LED of the each LED assembly to prevent the light emitted at the range of angles from being blocked by an adjacent LED assembly, wherein the first input surface segment and the third input surface segment have across-sectional curve that curves away from the LED and the second input surface segment has across-sectional curve that curves towards the LED; and an output surface, comprising: a first output surface segment; and a second output surface segment, wherein the second output surface segment and the second input surface segment form a convex lens and the second output surface segment is positioned to receive and redirect the light emitted at the range of angles by the LED that are redirected by the second input surface segment to a second range of angles that avoids the adjacent LED assembly; wherein the second range of angles redirected by the second input surface segment comprises approximately 40 degrees to 50 degrees relative to the central optical axis of the LED.

17. The luminaire of claim 16, wherein the second input surface segment redirects the light emitted by the LED to a redirected angle that is lower than an initial angle.

18. The luminaire of claim 16, wherein the second input surface segment and the second output surface segment work together to redirect the light emitted at the range of angles by the LED while maintaining a light efficiency of greater than 70%.

* * * * *